3,798,341
PERCOLATION PROCESS

Irwin L. Adler, River Vale, N.J., assignor to General Foods Corporation, White Plains, N.Y.
No Drawing. Filed Apr. 24, 1972, Ser. No. 247,125
Int. Cl. A23f 1/08
U.S. Cl. 426—432                                      3 Claims

ABSTRACT OF THE DISCLOSURE

A process of producing coffee extract by contacting roasted and ground coffee with an aqueous extraction liquor in a percolator set is disclosed wherein the direction of flow of the aqueous extraction liquid through each of the extraction columns in a cycle is reversed in the succeeding cycle. The process of this invention significantly decreases the heat exposure differences which a bed of coffee receives during extraction resulting in a more uniform extraction and a higher quality coffee extract.

BACKGROUND OF THE INVENTION

This invention relates to the production of coffee extract and more particularly to a novel method of producing a high quality coffee extract.

In the standard method of producing coffee extract commercially, a percolator set is used which normally contains from five to eight extraction columns wherein roasted and ground coffee is extracted by a countercurrent flow of extract liquid and coffee through the percolator set. Generally, an aqueous liquid is fed into the bottom of an extraction column containing the most spent (most extracted) roasted and ground coffee and the aqueous liquid then flows successively through each extraction column containing progressively less spent coffee and a predetermined amount of extract is drawn off from the fresh extraction column, that is, the extraction column containing the least extracted roasted and ground coffee. The extract is a solution of soluble coffee solids in water which was extracted in the successive extraction columns. The concentration of coffee solids increases as the extraction liquid flows through successive extraction columns. This drawn-off coffee extract generally contains about 20% to 35% coffee solids by weight of the extract. After each draw-off the coffee in the most spent extraction column is taken off-stream and an extraction column with freshly roasted and ground coffee is placed on-stream. Thus, the extraction column which had been the next most spent extraction column in the previous cycle then becomes the most spent extraction column in the succeeding cycle and the feed extraction liquid is introduced into this extraction column.

The aqueous extraction liquid generally is heated prior to being fed into the extraction column containing the most spent coffee. It is found that within a given extraction column there is an appreciable temperature and pressure decrease occurring in the direction of extraction liquid flow through the column. For example, when operating the extraction columns in upflow, that is, admitting the aqueous extraction liquor at the bottom of the extraction column and drawing it off at the top, the coffee at the bottom of the column experiences hotter temperatures and greater heat exposure than the coffee in the upper portion of the column. The situation, of course, is reversed when down-flow is employed. Normal extraction techniques make use either of an upflow of extraction liquid in all the extraction columns for all cycles or a downflow for all cycles. Thus, a bed of coffee within a given extraction column in a percolator set employing an upward flow of liquor for all extraction columns in all cycles will consistently experience hotter temperatures and greater heat exposure at the bottom of the column than at the top during the period in which the coffee is on stream. The difference between the entrance and exit portions of a column may be as great as 35% more heat exposure for the coffee nearest the entering liquor than for the coffee nearest the exit portion. Some prior art percolation suggests the use of flow reversal in an extraction column as a means of avoiding excessive pressure in a process designed to achieve extract concentration in excess of 35% solids. Reverse flow has also been used on an intermittent basis as a means of limiting pressure trouble in a particularly troublesome column such as described in U.S. Ser. No. 40,064, now U.S. Pat. 3,655,298. In these prior art methods the roasted coffee within the columns is still subject to substantial heat exposure differences resulting in non-uniform extraction of the coffee.

SUMMARY OF THE INVENTION

It has been found that reversing the direction of flow of aqueous extraction liquid through each extraction column in a percolator set in successive cycles significantly reduces the pressure and temperature variations throughout each extraction column. Roast and ground coffee within an extraction column thereby receives more uniform heat exposure resulting in more uniform extraction, higher yields, and a higher quality coffee extract than that achieved by conventional extraction techniques.

Reversal of the flow direction of aqueous extraction liquid through each extraction column in successive cycles is achieved by reversing the direction of liquid flow in an extraction column prior to passing it through the next adjacent extraction column.

In an alternate embodiment, flow reversal in successive cycles is achieved by employing a single direction of extraction liquid flow through all the extraction columns during a cycle and reversing this direction in the next cycle.

DETAILED DESCRIPTION OF THE INVENTION

The percolator set is a series of extraction columns connected by manifolding means to permit the flow of an aqueous extraction liquid to pass into a column, through the column, and out of the column into an adjacent column. While the aqueous extraction liquid is generally water, it may also be a water solution of salts or other solids, such as soluble coffee solids. The extraction liquid is generally heated prior to being fed into the percolator set with the extraction columns within the percolator set containing progressively less extracted roasted and ground coffee. The extraction liquid is fed into the extraction column containing the most extracted roasted and ground coffee and is then passed through successive extraction columns thereby increasing the soluble coffee solids in the extraction liquid. Coffee extract is drawn-off from the column containing the least extracted roasted and ground coffee thus completing a cycle. A cycle is the period from one draw-off of coffee extract to the next successive coffee extract draw-off.

The succeeding cycle is begun by removing the extraction column containing the most spent roasted and ground coffee and placing a column containing fresh coffee on-stream. The heated extraction liquid is then fed into the column containing the most extracted roasted and ground coffee, this coffee being the next most extracted coffee from the previous cycle. Extraction is continued as in the first cycle such that in each succeeding cycle the roasted and ground coffee in a given extraction column becomes progressively more extracted until, finally, it is taken off-stream after being the most extracted coffee within the set.

For the purpose of the following description of this invention, it will be assumed that the percolator set contains six columns numbered 1 through 6 with Column 1 containing the most extracted coffee and the succeeding columns containing progressively less extracted coffee. Column 6 contains the least extracted roasted and ground coffee and the exiting aqueous extraction liquid from this column is drawn-off as coffee extract in the first cycle.

Column 1, the column which receives the feed water contains the most spent or most extracted grounds. Heated water flows into the bottom and upward through this column contacting the roasted and ground coffee contained therein, and the exiting liquid from this column is of relatively low coffee solids concentration, i.e., relatively dilute. This liquid stream is then introduced into the top of Column 2 and flows downward through the coffee bed which is the next most extracted coffee. The exiting liquid from this column, now more highly concentrated, is then passed upward through Column 3, containing the next progressively less extracted coffee. The exit stream from this column then passes in a down-flow direction through Column 4 and the exiting liquid from 4 is pressed upward through Column 5. The exit from Column 5 is then passed downward through Column 6, containing fresh roasted and ground coffee and a predetermined amount of coffee extract is drawn-off from Column 6 thus completing the cycle. The exiting coffee extract from Column 6 is generally of from about 20% to 35% concentration. This coffee extract is then processed into soluble coffee powder.

When the coffee extract is drawn-off from Column 6, Column 1 is blown-down to remove the spent grounds and is loaded with freshly roasted and ground coffee. Column 2 now contains the most spent grounds for this cycle and it is this column to which the feed water is introduced. The feed stream is introduced into the bottom of Column 2 and proceeds upwards through the coffee bed contained therein. This, it will be noted, is the opposite liquid flow direction through the column than that in the preceeding cycle. The liquid stream continues through the remaining columns, alternating in flow direction from one column to the next, and increasing in concentration. Column 1, now containing fresh coffee, receives the extraction liquid at the top of the column and the liquid drawn off from the bottom of the column is the final coffee extract. Column 2 is then blown-down, charged with fresh coffee, and the feed water stream is introduced into the bottom of Column 3 now containing the most spent grounds for this cycle. The process then proceeds continuously as described above such that the coffee within a given extraction column becomes more spent with each successive cycle. For a six-column percolator set, then, a given bed of coffee receives six extractions from the time when it is charged as fresh coffee to the time it is discharged after being the most spent stage. In actual practice, a column is not on-stream for the full six cycles as time is required to discharge the spent coffee from the extraction column and to recharge the column with fresh roasted and ground coffee for the next extraction cycle.

The cooling of the liquid and pressure drop as it moves upward or downward through any given column results in coffee near the entrance of liquid receiving as much as 35% greater heat exposure than coffee at the discharge portion of the column. Thus, in a conventional extraction set-up employing upward flow through all the columns, a given charge of coffee is extracted in a number of stages from the initial charging of the column with the fresh coffee to blow-down of the column when the charge of coffee is fully spent. In each extraction stage, or percolator column, then, the lower portion of coffee within the column consistently receives liquid of higher heat content than the top portion receives. This heat exposure difference throughout the time the coffee is on-stream results in a poorer extraction for the top portion of the column and a poorer quality finished concentrated extract.

Use of the process of this invention, however, results in an equalizing of the heat exposure difference throughout a given extraction cycle. Thus, for example, Column 6 in the above-described process receives a downflow of liquid when it contains fresh roasted and ground coffee, an upflow of liquid when it becomes the next freshest stage, a downflow in the next stage, and so on until, for a six column percolation set, it receives an upward flow of feed stream when it becomes the most-spent stage. It should be noted, of course, that in order for such heat exposure equalizing to be effective in this embodiment, the direction of feed liquid flow through the most spent column should be maintained during each cycle. The column, therefore, receives three upflow extractions with the aqueous extraction liquid and three downflow extractions while it is on-stream. Use of the process of this invention has been found to reduce the heat exposure differences which a coffee bed experiences to as low as 9% over the period during which the coffee is on-stream.

Decreasing the heat exposure difference results in a more uniform extraction of the roast and ground coffee within the extraction columns of the percolator set. More equalized heat treatment results in a better quality coffee extract and also higher yields for the extraction process. Yield is defined as the percentage of coffee solids in the coffee extract based upon the dry solids in the column containing the freshest or least extracted roasted and ground coffee. As opposed to the standard percolation process, where a portion of the coffee within an extraction column consistently receives cooler extraction liquid and is therefore extracted less efficiently, the coffees extracted according to the process of this invention receive nearly equalized heat treatment through the extraction column over the period in which the coffee is on-stream. therefore, more of the total available coffee solids are removed during the percolation process.

It should be apparent, of course, that the above description is purely illustrative and that the feed stream may be admitted to the top of the first column and the exit from this column introduced into the bottom of the second column, and so on.

In an alternative but equally efficient embodiment of this invention, liquid flow reversal in a column from one cycle to the next may be achieved by employing a single direction of flow, say, upflow in all the columns during the first cycle and then employing downflow for all the columns in the next cycle, and so on such that for, say, a six-column set, a given bed of coffee receives upflow in three cycles and downflow in three cycles.

The key to the instant invention is that the direction of flow within each extraction column of the percolator set is reversed from cycle to cycle as a means of equalizing the heat treatment and extraction of coffee within each extraction column.

It should be noted also that this invention is equally applicable to both undecaffeinated and decaffeinated coffees. Further, any blend of coffees may be extracted according to the method of this invention. While normal percolator sets may contain a widely varying number of percolator columns it should be appreciated that this invention is applicable to any number of columns within a percolator set. Also, while the preferred embodiment employs discharging the most spent stage and recharging it with fresh roasted and ground coffee, the beginning of a new cycle may also be achieved by simply taking the spent column off-stream and placing a different fresh column on-stream.

The process of this invention may also be practiced in the decaffeination of coffee employing a series of extraction columns whereby green coffee is contacted within the extraction columns with a suitable caffeine extraction liquid, such as water. The reversal of the direction of flow of the extraction liquid from one cycle to the next again provides more equalized heat treatment for the coffee within the extraction columns resulting in a more uniform and efficient extraction, and thus, higher yields for the overall process and better quality products.

As noted previously, while the above illustrative process is described using water as the aqueous extraction liquid, it is also possible to use a dilute aqueous extraction liquid containing coffee solubles or other solids from some other convenient source. The temperature of the feed liquid may generally be anywhere from about 220° F. to about 370° F., and inter-column heating or cooling to heat or cool the exit stream from a column before it enters the next column may also be employed. Since the essential element in the instant invention is the reduction of heat exposure differences by reversing the direction of extraction liquid flow through each extraction column in a percolator set from one cycle to the next, it should be appreciated that such a process is applicable to any standard percolation technique employing any range of operating conditions such that substantial heat exposure differences are encountered.

EXAMPLE I

This invention may be practiced as follows:

A percolator set containing five extraction columns on-stream is originally charged with 185 pounds of roasted and ground coffee. Under steady-state conditions, feed water is introduced into the bottom of the column containing the most spent grounds at a temperature of 350° F. The exiting liquor from this column contains about 2% by weight of soluble coffee and is introduced into the second column containing the next most spent coffee. The temperature of this stream is approximately 345° F. and the exiting stream at the bottom of the column is about 325° F. This stream enters the bottom of the column containing the next progressively fresh coffee and exits at about 300° F. The fourth column receives this stream from the top and the existing extract stream at the bottom of the column is about 260° F. and a concentration of about 23%. This stream is then cooled and enters the bottom of the last column, containing fresh roast and ground coffee, and the exit stream from this column is the final coffee extract and is about 190° F. and a coffee solubles concentration of about 29%. The cycle time is about 35 minutes.

At the completion of the cycle, the column containing the most spent coffee is taken off-stream, feed liquid is introduced into the bottom of the column containing the next most spent coffee from the previous cycle, and a column containing fresh roasted and ground coffee is placed on-stream. The direction of extraction liquid flow is reversed from one column to the next and the cycle is completed when coffee extract is drawn-off from the column containing the fresh roasted and ground coffee. The most spent coffee from this cycle is taken off-stream, feed liquid is introduced into the bottom of the column containing the next most spent coffee from this previous cycle. The spent coffee column taken off-stream in the first extraction cycle, having since been charged with fresh coffee, is then placed on stream to become the fresh column for coffee extract draw-off in this third cycle. The cycles then proceed continuously as described above.

A similar process employing the identical percolator set and operating conditions but with an upflow of extraction liquid through all the columns for each cycle resulted in a heat exposure for the coffee at the bottom of the column which was 33% greater than that received by the coffee at the top of the column from the time the coffee is charged as fresh coffee to the time it is discharged. Employing the process of this invention as described in Example I, the heat exposure difference was reduced to only 9% greater heat exposure for the coffee at the bottom of the column.

While this invention has been described with reference to the above examples and illustrations, it will be apparent to those skilled in the art that various changes and modifications may be made without departing from the scope and spirit of this invention.

I claim:

1. A method of producing coffee extract by contacting roasted and ground coffee with an aqueous extraction liquid in a percolator set, said percolator set being a series of extraction columns connected by manifolding means to permit the flow of the aqueous extraction liquid to pass into an extraction column, through the extraction column, and out of the extraction column into an adjacent extraction column, comprising contacting roasted and ground coffee within the extraction columns of said percolator set with the aqueous extraction liquid by feeding said aqueous extraction liquid to the entrance of the extraction column containing the most spent roasted and ground coffee, the extraction liquid passing through said extraction column, out the exit of said extraction column and into the entrance of the next successive extraction column of the percolator set, the aqueous extraction liquid thus passing through extraction columns wherein the coffee within said extraction columns is progressively less extracted, and finally passing through the extraction column containing the freshest roasted and ground coffee; drawing off a predetermined quantity of coffee extract from the exit of the extraction column containing the freshest roasted and ground coffee completing a cycle; removing said most spent coffee and placing an extraction column containing fresh roasted and ground coffee on-stream, beginning the next succeeding cycle by feeding said aqueous extraction liquid to the entrance of the extraction column containing the most spent coffee, said most spent coffee being the next most spent coffee from the preceeding cycle, and continuing said cycles such that coffee within an extraction column becomes more spent with each succeeding cycle; the direction of flow of said aqueous extraction liquid through each extraction column being reversed from one cycle to the next.

2. The method of claim 1 wherein the direction of flow of said aqueous extraction liquid through an extraction column is reversed prior to passing through the next adjacent extraction column.

3. The method of claim 1 wherein the flow of said aqueous extraction liquid is in the same direction for all of the extraction columns in said percolator set, said direction being reversed from one cycle to the next.

References Cited
UNITED STATES PATENTS 3,655,398   4/1972   Pitchon et al. _____ 99—71

OTHER REFERENCES

Sivetz et al., Coffee Processing Technology, vol. I, 1963, p. 275.

FRANK W. LUTTER, Primary Examiner

W. L. MENTLIK, Assistant Examiner

U.S. Cl. X.R.

23—272.5

UNITED STATES PATENT OFFICE
CERTIFICATE OF CORRECTION

Patent No. 3,798,341    Dated March 19, 1974

Inventor(s) Irwin L. Adler

It is certified that error appears in the above-identified patent and that said Letters Patent are hereby corrected as shown below:

In column 5, line 37, change "existing" to -- exiting --.

Signed and sealed this 1st day of October 1974.

(SEAL)
Attest:

McCOY M. GIBSON JR.
Attesting Officer

C. MARSHALL DANN
Commissioner of Patents